Nov. 30, 1965

N. A. LEFEVRE ETAL
MEANS TO MONITOR OPERATION OF A
COATING AND DRYING APPARATUS 3,220,378

Filed June 15, 1962

INVENTORS.
Norman A. Lefevre
Harold G. Hahn
Edward R. Leigeb

Robert B. Ingraham
AGENT

Nov. 30, 1965   N. A. LEFEVRE ETAL   3,220,378
MEANS TO MONITOR OPERATION OF A
COATING AND DRYING APPARATUS
Filed June 15, 1962   2 Sheets-Sheet 2

INVENTORS.
Norman A. Lefevre
Harold G. Hahn
Edward R. Leigeb
BY Robert B. Ingraham
AGENT United States Patent Office 3,220,378
Patented Nov. 30, 1965

3,220,378
MEANS TO MONITOR OPERATION OF A
COATING AND DRYING APPARATUS
Norman A. Lefevre, 3695 Boy Scout Road, Bay City,
Mich.; Harold G. Hahn, 121 Wilson Drive, Midland,
Mich.; and Edward R. Leigeb, Rte. 3, Midland, Mich.
Filed June 15, 1962, Ser. No. 202,839
5 Claims. (Cl. 118—9)

This invention relates to an accessory particularly adapted for use with a spectrophotometer. It particularly relates to apparatus which is useful for the determination of the drying characteristics of coatings applied to substrates having at least some degree of transparency to the spectrophotometer beam.

Many problems arise in the coating of substrates such as plastic films both of thermoplastic nature and those prepared from regenerated cellulose with solvent coating systems, that is, coating systems wherein a substantially transparent material has dissolved in a volatile solvent and deposited on the surface of the film to alter or improve a desirable physical property. Typical of such coatings are those prepared from copolymers of vinyl and vinylidene chloride frequently referred to as saran. Such coatings may be dissolved in mixtures of ketones and aromatic hydrocarbon materials, certain cyclic ethers and the like. Generally such coating materials are applied in such a manner as to deposit a predetermined quantity on the surface of the substrate. Various coating compositions often differ in the drying characteristics and frequently a given coating composition such as a lacquer will deposit a coating having different characteristics when applied and dried under varying conditions. In the commercial production of coated substrates, particularly commercial application of lacquer and some aqueous coatings to substrates such as regenerated cellulose, polyvinyl chloride, polystyrene and the like, it is extremely important to know the characteristics of such a coating prior to the application thereof to a selected substrate utilizing commercial coating equipment. Frequently such drying characteristics may be determined by utilizing a spectrophotometer, frequently one which may be operated in the infrared region.

It is an object of this invention to provide an apparatus for use in conjunction with a spectrophotometer for monitoring the coating of a substrate transparent to the radiation.

It is a further object of this invention to provide a spectrophotometer accessory which may be used for drying coated films and like substrates under controlled conditions.

It is a further object of this invention to provide a spectrophotometer accessory which allows the spectrophotographic monitoring of a coated film during drying.

These benefits and other advantages are achieved in accordance with the invention by employing a spectrophotometer accessory comprising a housing, said housing having defined therein a first passageway adapted to pass a film sample, a second passageway disposed in angular relation to and intercepting said first passageway, said second passageway adapted to be interposed in a spectrophotometer beam, the common portions of said first and second passageways being in communication with a treating fluid source in cooperative combination with said housing, a film coating assembly comprising a film takeup means, a film supply means and film coating means, said film takeup means adapted to be disposed on one side of said second passageway, said film coating means and supply means disposed on the opposite side of said second passageway and means to forward said film for said supply means to said coating means and to said takeup means.

Further features and advantages of the invention will become apparent from the following specification when taken in conjunction with the drawings wherein:

FIGURE 1a is a sectional view of the apparatus of FIGURE 1 taken along the line 1a;

Figure 1:
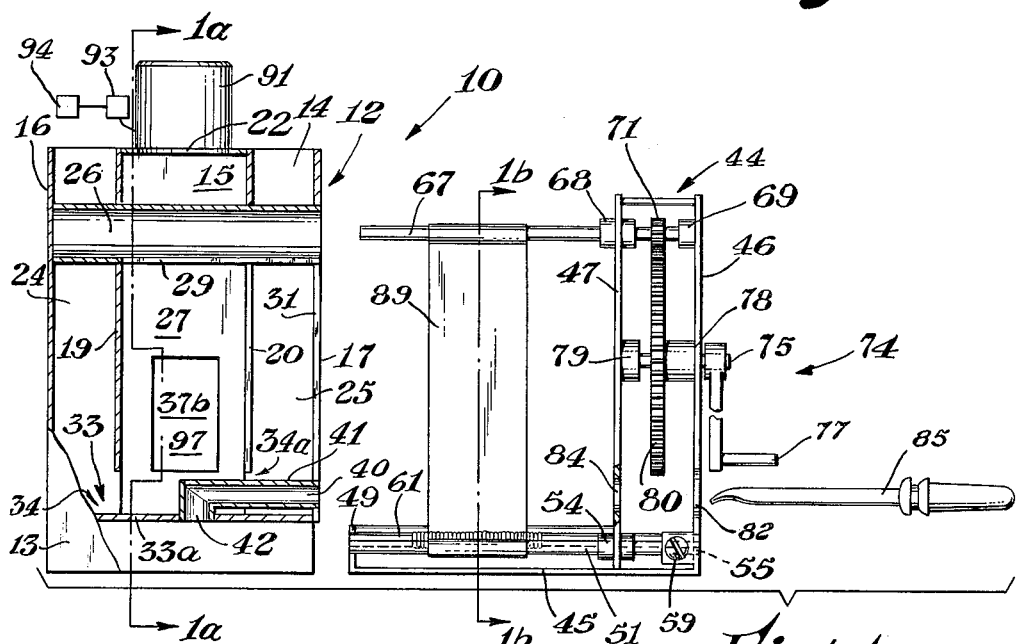
FIGURE 1 is an exploded cutaway view of a film drying monitoring assembly in accordance with the invention.

In FIGURE 1 there is illustrated an exploded cutaway view of a film drying monitoring assembly generally designated by the reference numeral 10. The assembly 10 comprises a hollow housing 12 which is formed of an outer first side wall portion 13, a second outer side wall portion 14 having disposed therebetween a first end wall 16 and an opposite or second end wall 17 to form a substantially rectangular housing generally designated by the reference numeral 12. Disposed within the housing are an opposed pair of inner walls 19 and 20 which in combination with the walls 13 and 14 define a centrally located drying fluid bifurcated passageway 15. The walls 13, 14, 16 and 19 define a first peripheral exhaust passageway 24. The walls 13, 14, 17 and 20 define a second peripheral or exhaust passageway 25. Disposed between the walls 16 and 17 and passing through the walls 19 and 20 is a plenum 26. A substrate slot 29 is defined by the plenum 26 and a pair of generally parallel walls 27 and 28. The slot 29 is in full communication with the slot 31 defined by the wall 17. A gas inlet opening or passageway 22 is defined in the top portion of the housing 12 generally adjacent the plenum 26. A bottom 33 is positioned between the walls 13, 14, 16 and 17 at a location remotely disposed from the inlet opening 22. The bottom 33 comprises two portions 33a and 33b. The portions 33a and 33b terminate adjacent the slot 29. A window 37 is provided within the wall 13. Corresponding windows 37a, 37b and 37c are defined in the walls 14, 28, and 27 respectively. The windows 37, 37a, 37b and 37c provide a path for a spectrophotometer beam generally perpendicular to the plane of the wall 27. The walls 19 and 20 extend downwardly from the top portion of the housing 12 toward the bottom 33 between the side walls 13 and 14 and terminate at a location between the windows 37, 37a, 37b, and 37c, and the bottom 33 of the housing 12 forming exhaust means 34 and 34a. The wall 17 defines an entry port 40 which provides a passageway 41 from the exterior of wall 17 to a dispensing port 42 defined in the bottom portion 33a. Shown in exploded relationship to the housing 12 is a film coating and transport unit generally indicated by the reference numeral 44. The film coating transport unit 44 comprises a base plate 45 which is secured to an end plate 46 and an intermediate and parallel support plate 47. The base plate 45 is also provided with a flange 49. A substrate supply mandrel 51 is rotatably supported within the flange 49 within the plate 47 within the end plate 46 by the bearing 55. The bearing 55 is provided with a brake pad 57 which is in cooperative combination with the adjusting screw 59. A metering means or wire wound rod 61 is rotatably supported within the flange 49 and within the end plate 46. Oppositely disposed from the metering rod 61 is a taekup roll 67 which is supported by the bearing 68 in plate 47 and bearing 69 in the end plate 46. The roll 67 carries a spur gear 71. A driving means 74 is provided comprising a shaft 75 in operative communication with an operating means or crank 77. The shaft 75 is rotatably supported in the plates 46 and 47 by means of the bearings 78 and 79 respectively. A spur gear 80 is rigidly affixed to the shaft 75 and is in operative engagement with the spur gear 71. Within the end plate 46 there is provided an opening 82 oppositely disposed to an opening 84 in the plate 47 which is adapted to pass the coating composition supply conduit 85 and permit access to the opening 42 of the bottom plate 33a. A substrate or plastic film 89 is shown in operative engagement with the film supply mandrel 51. The supply mandrel 51, the metering means 61 and the takeup mandrel 67.

Disposed adjacent the window 38 is a spectrophotometer light source 97 and oppositely disposed thereto and adjacent the window 37 is disposed a detecting means 98 for the spectrophotometer light source.

Figure 1A:
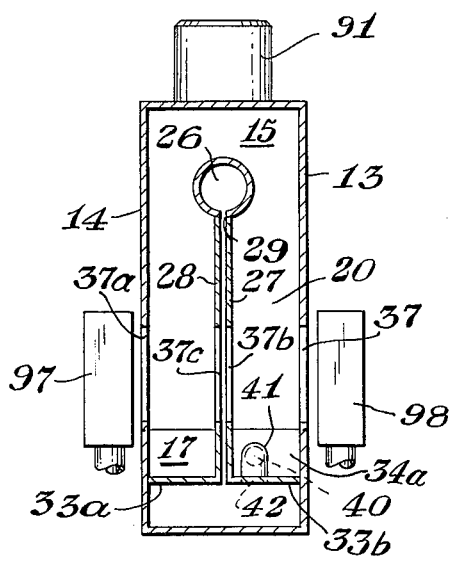

Disposed adjacent to the passageway 22 is a hot air or gas supply 91 having a temperature control means 93 which in turn is controlled by a temeprature rate controlling means 94. In FIGURE 1a there is illustrated a sectional view of the housing 12 taken along the line 1a of FIGURE 1 illustrating the relationship of the windows 37, 37a, 37b and 37c within the walls 13, 14, 27 and 28 including the exhaust means 34a and the substrate slot 29 defined by the walls 27 and 28. A light source 97 and a detector 98 are illustrated in their operating relationship to the housing 12. Also there is illustrated the configuration of the bifurcated passageway 15 and the plenum 26 and the slot 29 to receive the appropriate portions of the film coating assembly and the film 89. Bottom portions 33a and 33b are joined to walls 28 and 27 respectively adjacent the bottom portion of the slot 29.

Figure 1B:
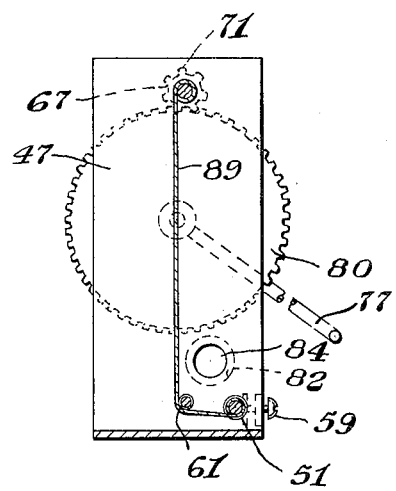
FIGURE 1b is a sectional view of the apparatus of FIGURE 1 taken along the line 1b.

In FIGURE 1b is illustrated a sectional view of the film coating and transport assembly 44 of FIGURE 1 which depicts the relationship between the takeup roll 67, the film 89, metering means 61 and the substrate supply mandrel 51 and the relationship to the openings 82 and 84 adapted to pass the coating composition to the film 89. Also depicted are the gears 71 and 80 which rotate the takeup roll 67.

Figure 2:
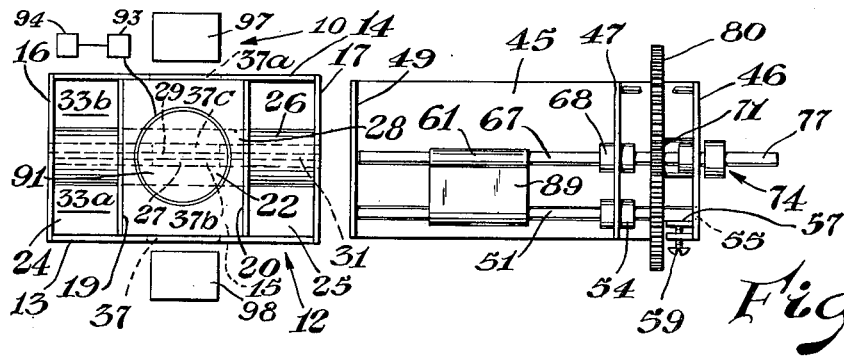
FIGURE 2 is an exploded top view of the apparatus of FIGURE 1.

In FIGURE 2 there is illustrated a top view of the apparatus of FIGURE 1 wherein the relationship of the walls 13, 14, 16, 17, 19, 20, 27 and 28 are shown and the slot 29, the coating assembly, as well as the peripheral exhaust passages 24 and 25 and the bifurcated gas passageway 15. The windows 37, 37a, 37b, and 37c are defined within the walls 13, 14, 27 and 28, respectively. The spectrophotometer light source 97 and the detecting means 98 are arranged on either side of the housing 12 in such a way that light passes through the windows 37, 37a, 37b and 37c from the source 97 to the detecting means 98, and passes through the film such as the film 89 supported on the transport means 44. The film supply mandrel 51 is disposed adjacent one edge of the base plate 45 whereas the metering rod 61 is disposed directly below the takeup roll 67 and is hidden thereby.

Figure 3:
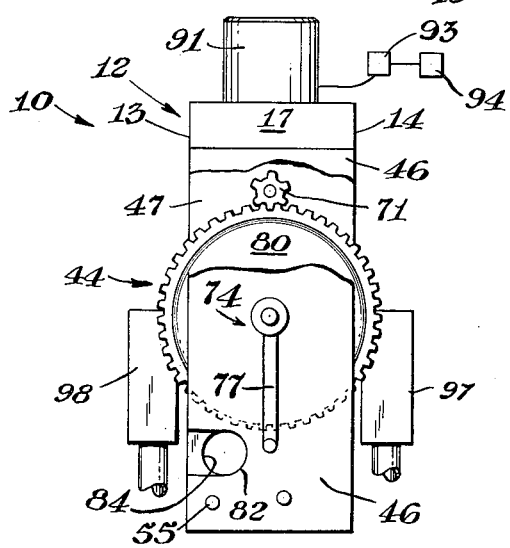
FIGURE 3 is an end view of the apparatus of FIGURE 1.

In FIGURE 3 there is depicted an end view of the apparatus 10 viewed from the operating side of the film coating and transport means 44 further ilustrtaing the relationship of the spur gears 71 and 80 with a portion of the end plate 46 cut away. In operation of the apparatus in accordance with the invention the source of hot air 91 forces a controlled temperature air or other gas to the central passageway 22 surrounding the slot 31 carrying a film 89. The temperature of the air is adjusted to the desired temperature. The quantity of the coating material to be evaluated is introduced through openings 82, 84 and 42 onto the portion of the web lying between the supply mandrel 51 and the metering rod 61. Rotation of the crank or operating means 77 serves to quickly and evenly distribute the coating material over the surface of the web 89 as the web is drawn into a position between the metering rod 61 and the takeup roll 67. Adjacent the window 38 is a spectrophotometer light source 97 and adjacent the window 37 is a spectrophotometer detector 98. Thus, a light beam from the light source 97 passes in the window 38 through the film 89 out of the window 37 and is received by the detector 98. Thus, when a coating is applied to the web 89 the variations in the transmission or absorption of the film are readily detected under the controlled drying conditions of the apparatus. The path of air flow within the housing 12 from the hot air supply means 91 is through the passageway 15 over each of the surfaces of the film 89 and the air is then passed out through the passageways 24, thus providing a means of insulation for the center heating chamber or passageway 15. This provides a substantially uniform control of the temperature at the point of drying and coating.

In control of the temperature of the air frequently it is beneficially accomplished by resistance heaters in air stream which in turn are controlled by a variable voltage supply thus permitting the temperature of the air to be readily adjusted from ambient temperatures up to temperatures sufficient to cause degradation of the substrate being coated. Frequently it is advantageous to determine the drying characteristics of a constant rate of temperature increase. This is readily accomplished by providing the temperature controlling means such as 93 with a rate determining means. Typically in operation an auto transformer is frequently used as the temperature controlling means and a synchronous timing motor having a suitable gear train is utilized to alter the heating of the auto transformer at a predetermined rate. Beneficially, the windows 37 and 37A within the apparatus are sodium chloride crystals or similar infrared transparent material. This also serves to prevent heated air from escaping from the apparatus, contacting the spectrophotometer light source and sensing element. Advantageously, a recording spectrophotometer may be utilized wherein the drying characteristics of the coated substrate is recorded continuously to give a convenient plot for the comparison of coating materials.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A spectrophotometer accessory adapted for continuous monitoring of the drying of a coated film, the accessory comprising a hollow housing having a first side wall, a second side wall, a first end wall and a second end wall, a bottom and a top, the bottom defining a slot lying between the side walls, the top defining a gas inlet opening, a pair of generally parallel walls disposed within the housing and defining a substrate slot therebetween, the substrate slot being in full communication with the slot in the bottom of the housing, the side walls and the generally parallel walls delning a bifurcated gas passageway from the gas inlet opening to the bottom of the housing, each of the end walls in operative association with exhaust means to permit the escape of gas from the bifurcated passageway at a location generally adjacent the bottom of the housing, the side walls and generally parallel walls each defining a window so constructed and arranged so as to permit the beam of the spectrophotometer to pass through the windows in a direction generally perpendicular to the plane of the substrate slot between the generally parallel walls, the windows being disposed between the means to exhaust the gas from the bifurcated passageway adjacent the bottom of the housing and the top of the housing, in cooperative combination with the housing a film coating assembly comprising a film takeup means,
a film supply means and
a film coating means,
the film takeup means being disposed generally adjacent the top of the housing, the film coating means and supply means being disposed adjacent the bottom of the housing and adapted to pass a coated film into the slot in the bottom of the housing to the substrate slot between the generally parallel walls past the windows of the parallel walls,
and means to forward the film from the supply means to the coating means and to the takeup means.

2. The apparatus of claim 1, in cooperative combination with a spectrophotometer whereby the beam of the spectrophotometer can pass through the windows in the housing and generally parallel walls and through a film positioned within the substrate slot.

3. The apparatus of claim 1, wherein the top of the housing is spaced from each of the end walls and secured to the side walls, a pair of inner walls extending from the top toward the bottom between the side walls and terminating at a location between the windows of the generally parallel walls and the bottom of the housing.

4. The apparatus of claim 3, wherein the gas inlet opening is in cooperative combination with a source of heated gas.

5. The apparatus of claim 4, wherein the temperature of the source of heated gas is in cooperative association with means to alter its temperature in a predetermined manner.

References Cited by the Examiner
UNITED STATES PATENTS

| | | | |
|---|---|---|---|
| 1,316,784 | 9/1919 | Frothingham et al. | 118—415 X |
| 1,890,463 | 12/1932 | Herman | 118—65 X |
| 1,944,835 | 1/1934 | Boyers | 118—415 X |
| 2,159,297 | 5/1939 | Shover | 118—65 |
| 2,239,452 | 4/1941 | Williams et al. | 118—9 X |
| 2,599,947 | 6/1952 | Sherman et al. | 118—118 |
| 2,632,422 | 3/1953 | Elkins | 118—415 |
| 2,714,363 | 8/1955 | Speed et al. | 118—9 |
| 2,936,732 | 5/1960 | Ring et al. | 118—9 |

CHARLES A. WILLMUTH, *Primary Examiner.*

RICHARD D. NEVIUS, WILLIAM D. MARTIN,
*Examiners.*